(12) United States Patent
Takahashi et al.

(10) Patent No.: US 6,185,480 B1
(45) Date of Patent: Feb. 6, 2001

(54) INTERFERENCE PREVENTING METHOD FOR INDUSTRIAL ROBOTS

(75) Inventors: Toshiyuki Takahashi; Atsushi Nakajima; Yukimasa Shiomichi, all of Yamaguchi (JP)

(73) Assignee: Toyo Kohan Co., Ltd, Tokyo (JP)

( * ) Notice: Under 35 U.S.C. 154(b), the term of this patent shall be extended for 0 days.

(21) Appl. No.: 08/981,081

(22) PCT Filed: Jun. 12, 1996

(86) PCT No.: PCT/JP96/01583

§ 371 Date: Dec. 23, 1997

§ 102(e) Date: Dec. 23, 1997

(87) PCT Pub. No.: WO96/41705

PCT Pub. Date: Dec. 27, 1996

(30) Foreign Application Priority Data

Jun. 13, 1995 (JP) .................................................... 7-171431

(51) Int. Cl.$^7$ .............................. G05B 19/04; B25J 13/00
(52) U.S. Cl. .......................... 700/255; 700/63; 700/178; 318/568.18
(58) Field of Search ..................................... 700/247, 248, 700/249, 250, 253, 255, 56, 63, 64, 69, 77, 88, 75, 262, 264, 178; 318/568.12, 568.14, 568.13, 568.18, 568.21; 901/16, 2–5, 9, 49; 414/751, 792.9

(56) References Cited

U.S. PATENT DOCUMENTS

| | | | |
|---|---|---|---|
| 3,943,343 | * | 3/1976 | Irie .................................. 318/568.15 |
| 4,424,472 | * | 1/1984 | Jacot-Descombes et al. .. 318/568.13 |
| 4,593,366 | * | 6/1986 | Sugimoto et al. ................... 700/262 |
| 4,604,561 | * | 8/1986 | Kamajima et al. .................. 318/567 |
| 4,617,502 | * | 10/1986 | Sakaue et al. ................... 318/568.18 |
| 4,644,237 | * | 2/1987 | Frushour et al. ..................... 318/640 |
| 4,694,232 | * | 9/1987 | Suzuki et al. ................... 318/568.13 |
| 5,150,451 | * | 9/1992 | Deplano ............................... 700/248 |
| 5,349,533 | | 9/1994 | Libby .................................... 701/301 |

FOREIGN PATENT DOCUMENTS

| | | |
|---|---|---|
| 0307091 | 3/1989 | (EP) . |
| 62-027234 | * 2/1987 | (JP) . |
| 2-15986 | 1/1990 | (JP) . |
| 2-232184 | 9/1990 | (JP) . |
| 3-104581 | 5/1991 | (JP) . |
| 5-100732 | 4/1993 | (JP) . |

OTHER PUBLICATIONS

B. Aronov et al., Minimum–Speed Motions, The International Journal of Robotics Research, vol. 10, pp. 228–239, Jun. 3, 1991.

* cited by examiner

Primary Examiner—William Grant
Assistant Examiner—Steven R. Garland
(74) Attorney, Agent, or Firm—Browdy And Neimark

(57) ABSTRACT

An interference preventing method for industrial robots comprising a step (II) of reading a present position of the hand, a step (III) of computing the difference between the taught target position and the present position of the hand, a step (IV) of judging whether this difference is within a predetermined range or not, a step (V) of setting a moving speed of the hand to a predetermined normal speed when the difference is within the predetermined range, a step (VI) of setting the moving speed of the hand to a predetermined low speed when the difference is out of the predetermined range, and a step (VII) of moving the hand automatically to the target position at the set speed. When the hand is moved over a long distance in the case of which interference is liable to occur, the moving speed thereof is low; when the hand is moved over a short distance, the moving speed thereof is normal. Therefore, the hand can be stopped easily just before interference occurs, and the overall operation efficiency can be improved.

4 Claims, 7 Drawing Sheets

(a)

(b)

INTERFERENCE PREVENTING METHOD FOR INDUSTRIAL ROBOTS

TECHNICAL FIELD

The present invention relates to an interference preventing method for industrial robots and handling robots used for the same, and more particularly, a method which can return a robot which is made to stop its operation by the occurrence of a trouble to a predetermined position and prevents the interference of the robot with an object disposed around the robot during a handling operation in which works which are stacked on a work stack base is gripped one by one and works are fed to a working machine such as a press or a press brake or a packaging machine such as a binder one by one and are stacked on a stack base one by one, and a robot used for the method.

BACKGROUND OF THE INVENTION

Conventionally, as shown in FIG. 7, this type of robot is disposed in front of a working machine 50 such a press brake. The robot is constructed such that a first arm 53 which is rotatable on a horizontal axis (a first axis J1) is radially connected to an upper portion of a support strut 51 mounted on a floor by means of a first rotated joint 52. A second arm 55 which is rotatable on a horizontal axis (a second axis J2) is radially connected to a distal end of the first arm 53 by means of a second rotated joint 54. A third arm 57 which is rotatable on a horizontal axis (a third axis J3) is connected to a distal end of the second arm 55 in a coaxial direction by means of a third rotated joint 56. A hand 59 which is rotatable on a horizontal axis (a fourth axis J4) is connected to a distal end of the third arm 55 by means of a fourth rotated joint 58. These rotated joints are respectively provided with servo motors M1,M2,M3,M4 and position detecting means such as encoders for detecting the rotating positions of these rotated joints. By constantly detecting the position of the hand 59 with the position detecting means, the rotating angles of these rotated joints are controlled such that the hand 59 traces a plurality of points which are preliminarily taught and stored in memory. The coordinates of the position of the center of the hand 59 is Cartesian coordinates made of an X coordinate (a direction of arrow X) which is a traverse distance of the hand 59 when the hand 59 is moved in parallel in a horizontal direction by a combination of the rotations of the first to third rotated joints and a Y coordinate (a direction of Y) which is a traverse distance of the hand 59 when the hand 59 is parallelly moved in a vertical direction by a combination of the rotations of the first to third rotated joints. The posture of the hand 59 is controlled by two polar coordinates made of an A coordinate which is a rotating angle of the hand 59 around the fourth axis J4 and a B coordinate which is a rotating angle of the hand 59 around the third axis J3. The origin of the coordinates of four axes is arbitrary and a basic posture of the robot may be predetermined as such an origin. The hand 59 is provided with a gripping element such as a vacuum cup 60. The servo motors M1 to M4 are controlled by a microcomputer installed in a control panel 61.

With such a robot 62, a series of operations which comprise descending the hand 59 to suck and pick up a work which is not yet subjected any working from a work supply base 63, advancing and inserting one edge of the work into the working machine 50 to bend the work, retracting the work from the working machine 50 to a predetermined position where the hand is rotated about a horizontal axis, subjecting the other edge of the work to the working of the working machine 50, and stacking the work on a product stacking base 64 after working on the work is completed, and returning the hand 59 to the work supply base 63 to pick up a next work which is not yet subjected to any working, are carried out as a cycle and these cyclic operations are repeated. It must be noted, however, that the lifting amount of the hand is changed corresponding to the height of works remaining on the work supply base 63 as well as on the product stacking base 64.

To carry out the above-mentioned repetitious operations in a most efficient manner, the robot 62 is preliminarily taught so as to execute operations on the above-mentioned four axes in an overlapping manner or simultaneously. Since the robot 62 carries out the operations in accordance with sequences and timings which are preliminarily taught, no trouble occurs so long as the operations are carried out in a normal routine. However, when a trouble such as dropping of the work in the midst of the routine work occurs and the operation of the robot is stopped accordingly, the robot 62 is returned to a fixed position where the position of the work can be determined, e.g. a position on the work supply base or a position on the mold of the working machine and the work is gripped again. Then, the work is returned to a position where the robot is stopped while being gripped by the robot and the robot is operated again in accordance with a program of the original routine. Conventionally, in such a case, a next target position to which the hand is to be moved is taught and the hand is moved to the target position with an automatic manipulation or the hand is moved to the target position with a manual manipulation such that the hand is moved little by little by manually operating the axes one after another.

To move the hand to the taught target position with the automatic manipulation, however, the operations on the four axes are carried out simultaneously without any sequence, the work or the hand may heavily comes into contact with objects located around the robot and accordingly the hand may be broken or ruptured. On the other hand, the manual manipulation which is carried out by operating the axes one after another at a low speed takes a considerable operating time thus lowering an operating efficiency.

Accordingly, it is an object of the present invention to provide an interference preventing method which can enhance the efficiency in an operation to return the robot to the normal operation after the occurrence of a trouble and the robot which can carry out the method.

DISCLOSURE OF INVENTION

The interference preventing method for industrial robots according to the present invention is characterized in that, an operation to automatically move a hand of a robot toward a taught target position, comprises a step of reading the present position of the hand, a step of computing the difference between the taught target position and the present position of the hand, a step of judging whether this difference is within a predetermined range or not, a step of setting the moving speed of the hand to a predetermined normal speed when the difference is within the predetermined range, a step of setting the moving speed of the hand to a predetermined low speed when the difference is out of the predetermined range, and a step of moving the hand automatically to the target position at the set speed. The above-mentioned 'predetermined range' is determined in view of the kind of operation, the size of the work or the size and shape of an object disposed around the robot. The above-mentioned 'movement of the hand' includes a revolution of the hand around a horizontal axis or a vertical axis in addition to the traverse of the central point of the hand in a space. In this case, the central point of the hand does not move and the hand is only angularly shifted.

According to the method of the present invention, present positions are determined by a plurality of coordinates and the difference between the taught target position and at least coordinates on one axis is computed and the judgement is made based on the difference. Alternatively, it may be possible to set the moving speed of the hand to a low speed when at least one of the coordinates is out of the predetermined range.

The handling robot according to the present invention is a type of a robot which repeats an operation to pick up a work from a predetermined position and transfer the work to another position in place in accordance with the taught path and the operational sequence. The handling robot comprises a hand to grip the work, a mechanism to move the hand, a detector which detects the present position of the hand, means for teaching a target position of the hand, a mechanism for moving the hand, means for storing the moving speed of the hand which varies at least in two stages and a predetermined range of difference between these speeds, means for computing the difference between a taught target position and the present position of the hand, means for judging whether the difference is within the predetermined range or not, and means for setting the moving speed of the hand to a normal speed when the obtained difference is within the predetermined range while setting the moving speed of the hand to a low speed when the obtained difference is not within the predetermined speed.

According to the method of the present invention, without computing whether the interference actually takes place or not, based on the fact whether the distance between the taught target position and the present position is within the predetermined range or not, it is judged whether the probability of interference is high or not. Namely, in a case that the distance from the present position to the target position is short, which takes place, for example, when the work which is not subjected to any working is dropped right after the work is picked up from the work supply base, the probability of the interference is relatively low. On the other hand, in a case that the hand must be moved or shifted over a long distance from the present position to the target position, which takes place, for example, when the work which is already subjected to working is dropped just before being stacked on the product stacking base, the probability of interference is relatively high. Based on this principle obtained by experience (i.e., empirically) that when the distance between the present position and the target position, namely, the distance to be moved is long, the probability of interference is high, while when the distance to be moved is short, the probability of interference is low, the present invention uses the 'difference' between the target position and the present position as a criterion for judging the probability of interference. Accordingly, the present invention has an advantage that the computation for the judgement whether the interference occurs or not becomes simple enabling a high speed judgement, while preventing the interference with an enough safety.

Furthermore, when the hand is to be moved over a short distance, the hand is moved at a normal speed so that the high operational efficiency is assured, while when the hand is to be moved over a long distance, the speed is shifted to a low speed so that an operator can forcibly stop the movement of the hand just before the hand causes an interference thus reliably preventing such an interference.

After forcibly stopping the movement of the hand, the operator manually manipulates the robot such that the hand is moved to a position which can prevent the interference. The hand is automatically moved to the target position when there is no possibility of interference. It may be possible to determine the target position again after the hand is stopped right before the occurrence of the interference. In this manner, according to the present invention, the interference can be reliably prevented with a simple computation as a whole by changing the operational speed based on the difference of distance between the present position and the target position, while skillfully combining the automatic operation and the manual operation.

The above-mentioned interference prevention method is provided for a robot which can trace a route which prevents the interference, namely, the robot which has more than two traverse coordinates. The method, however, is more effective for the robot which has a complicate traverse coordinate system comprising more than three or four traverse coordinates. In such a case, the above-mentioned method is applied to any one of the traverse coordinates which is liable to cause the interference or is applied to a plurality of traverse coordinates and all operations are carried at a low speed when the difference between the present position and the target position is out of a predetermined range. The robot according to the present invention is provided for carrying out the above-mentioned interference preventing method.

BEST MODE FOR CARRYING OUT INVENTION

The interference preventing method and the robot used for the method are explained with reference to embodiments thereof in conjunction with attached drawings hereinafter.

Figure 1:
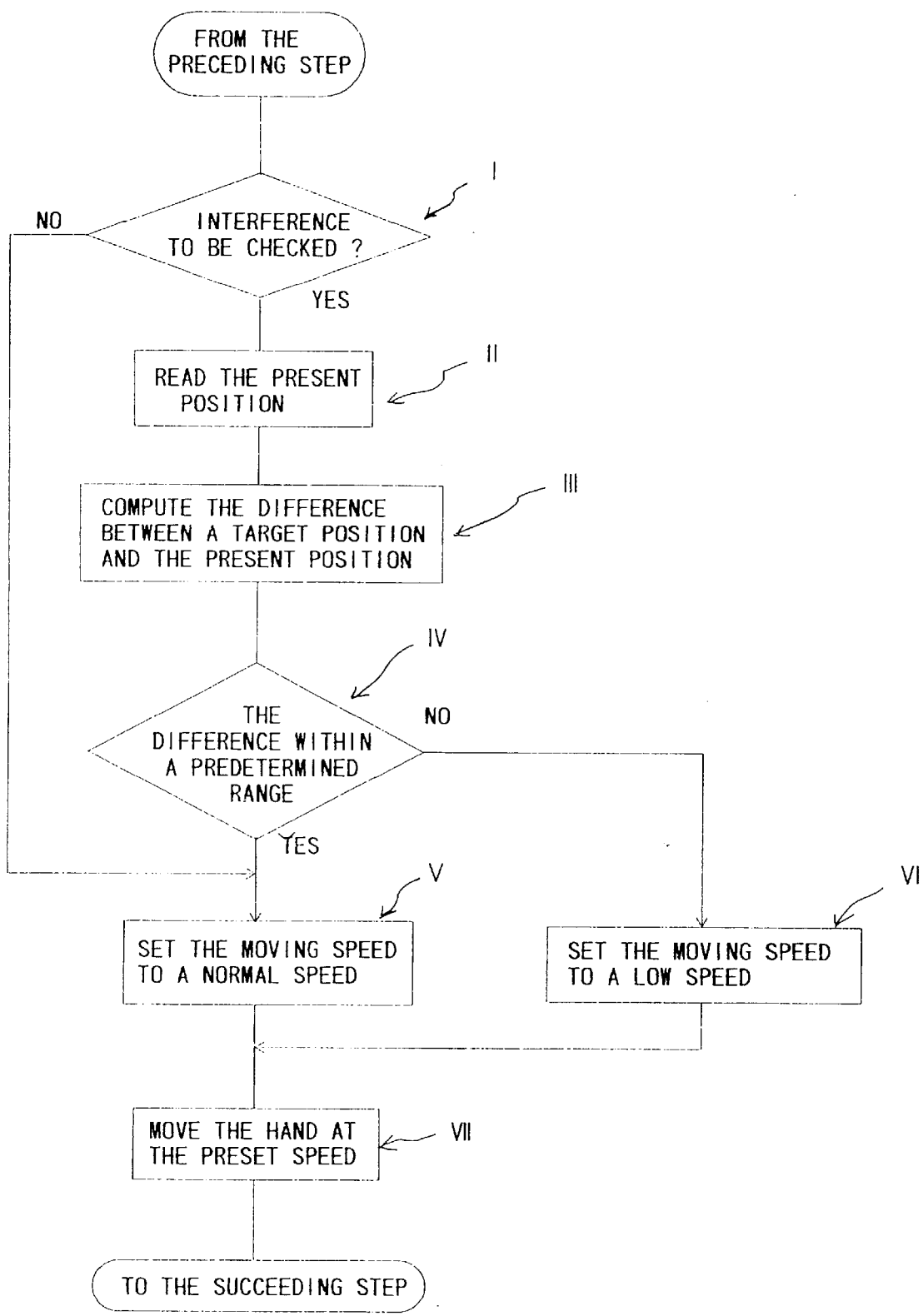
FIG. 1 is a schematic flow chart showing one embodiment of the interference preventing method according to the present invention
Figure 2:
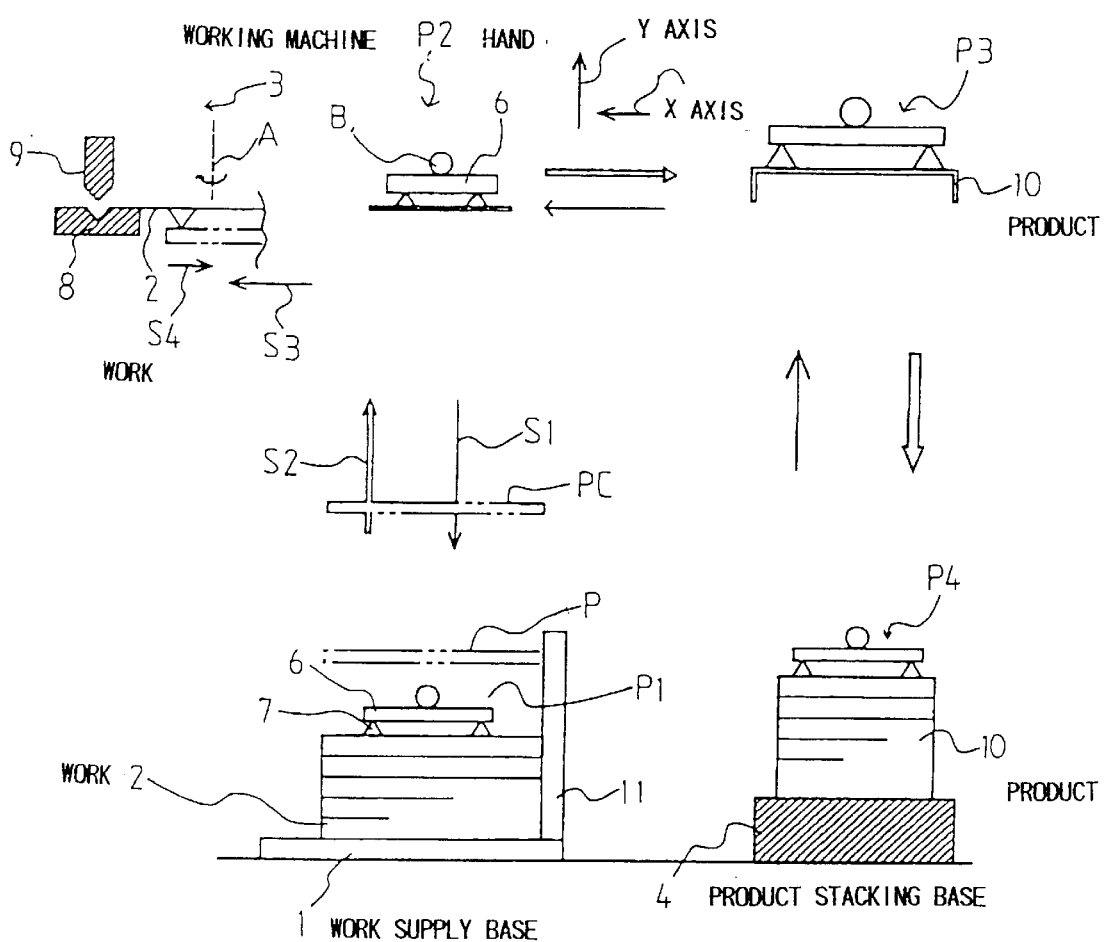
FIG. 2 is a schematic diagram showing the steps of main routine of the handling method to which the method of FIG. 1 is applied.
Figure 3:
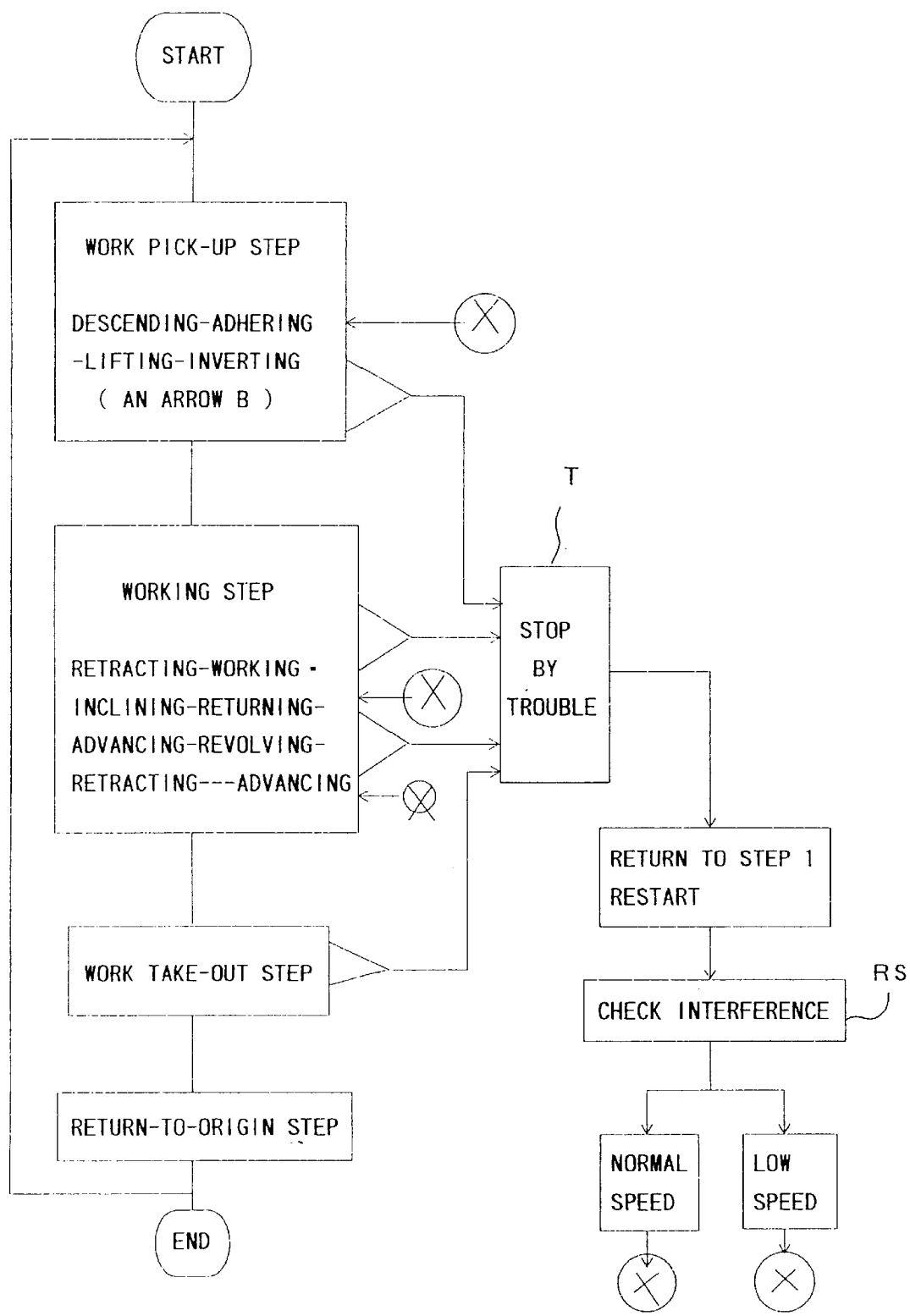
FIG. 3 is a schematic flow chart showing the main routine of FIG. 2.
Figure 4:
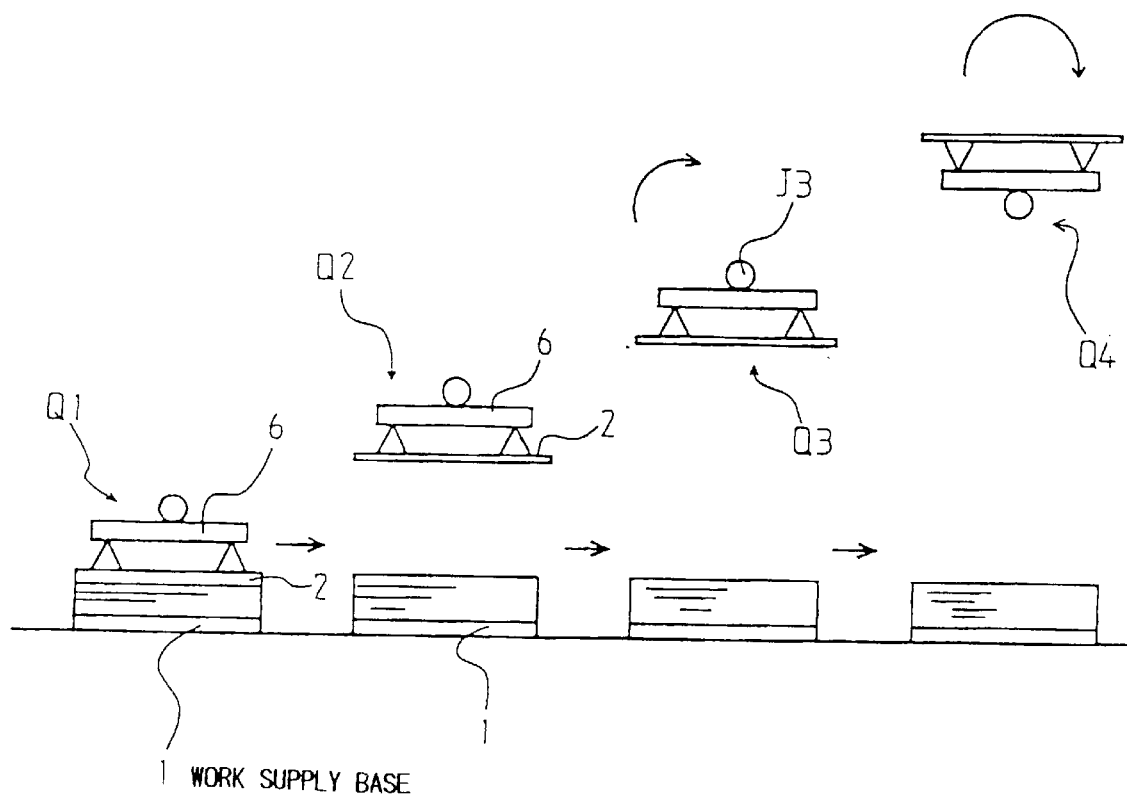
FIG. 4 is a schematic diagram showing the detail of another embodiment of the interference preventing method of the present invention.
Figure 5:
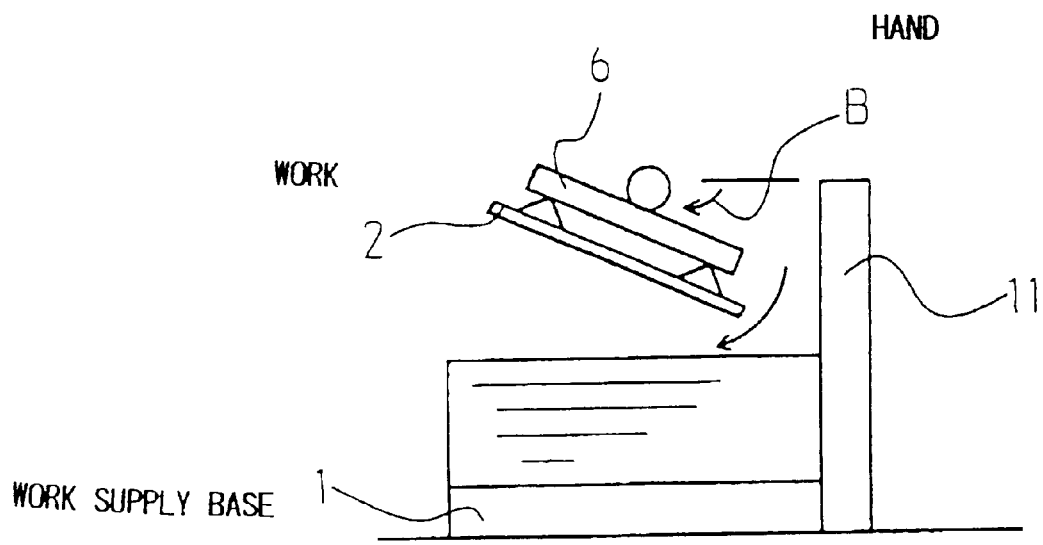
FIG. 5 is a schematic diagram showing the detail of another embodiment interference preventing method of the present invention
Figure 5:
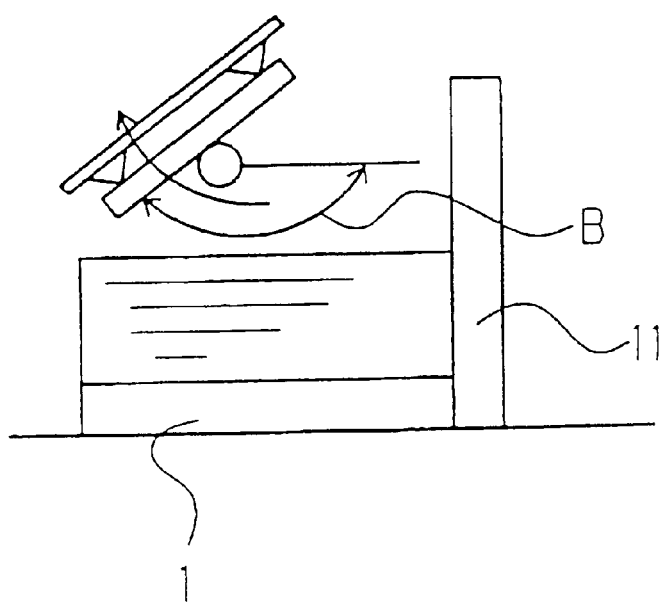
Figure 6:
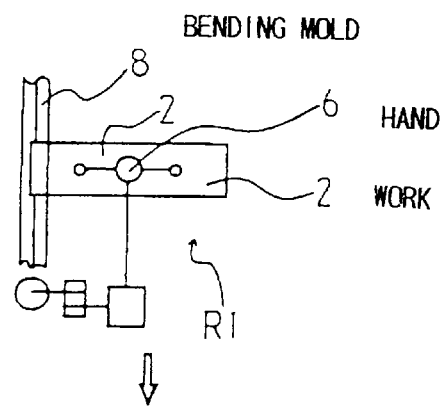
FIG. 6 is a schematic diagram showing the detail of another embodiment of the interference preventing method of the present invention
Figure 6:
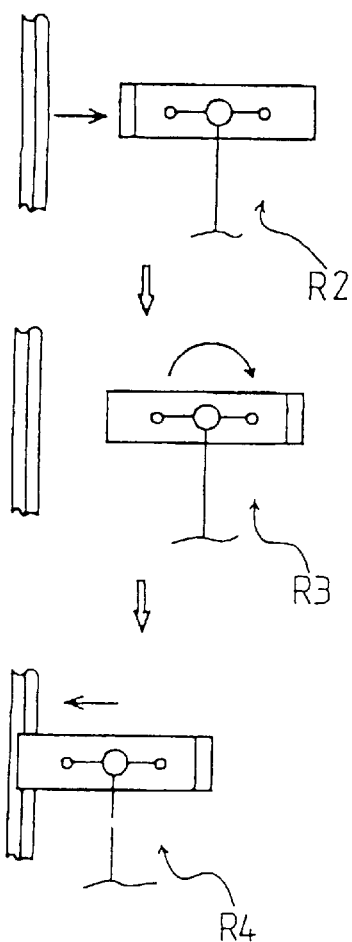
Figure 7:
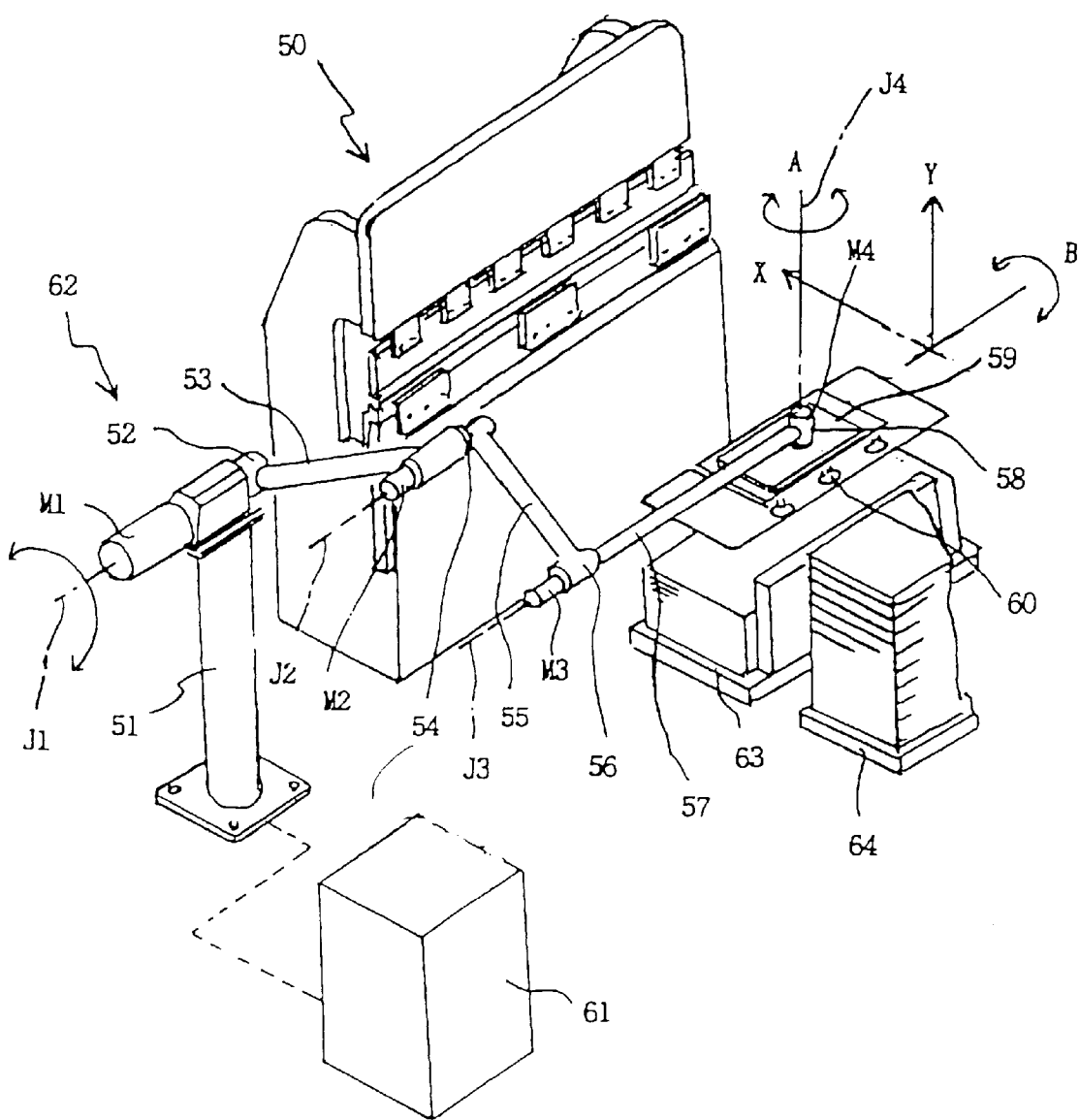
FIG. 7 is a schematic view showing the handling robot used for the method of the present invention and peripheral devices thereof.

In the drawings, FIG. 1 is a schematic flow chart showing one embodiment of the interference preventing method according to the present invention, FIG. 2 is a schematic diagram showing the steps of main routine of the handling method to which the interference preventing method is applied, FIG. 3 is a schematic flow chart showing the main routine of the interference preventing method, FIG. 4, FIG. 5 and FIG. 6 are schematic diagrams showing the detail of other embodiments of the interference preventing method of the present invention, and FIG. 7 is a schematic view showing the handling robot used for the method of the present invention.

The entire steps of the handling method to which the method of the present invention is applied are explained with reference to FIG. 2 and FIG. 3. In FIG. 2 and FIG. 3, numeral 1 indicates a work supply base which supplies works which are not subjected to any working, numeral 3 indicates a working machine such as a press brake, and numeral 4 indicates a product stacking base on which products 10 which are subjected to working are stacked. Setting the reference position of a hand 6 at a point P1, the hand 6 is descended to a point P1 (an arrow S1) and a suction cup 7 is forcibly made come into contact with the work 2 on the work supply base 1 so as to adhere the work 2 by suction, then the hand 6 is lifted (an arrow direction S2). This step constitutes 'work pick-up step' in FIG. 3.

Subsequently, the hand 6 is rotated 180 around a horizontal axis (the third axis J3 in FIG. 7) and is advanced to the working machine 3 (an arrow S3) so as to place one edge of the work 2 on a bending mold 8 and a punch 9 is descended to bend the edge of the work in a V shape, for example. In this bending operation, the hand 6 of the robot is rotated around the center of bending (the first axis J1 in FIG. 7) while maintaining the adhering of the work 2 by suction. Then, the hand 6 is retracted (an arrow direction S4) and is rotated 180° around a vertical axis, and another edge of the work 2 is subjected to the bending operation in the same manner. This operation constitutes 'working step' in FIG. 3.

Then, the hand 6 is again retracted and is moved to transfer the product 10 obtained as a result of working to a point P3 above the product stacking base 4, while maintaining its posture. There, the hand 6 is rotated 90° around a vertical axis, and is descended to place the product 10 on the product stacking base 4 and is lifted to return to the reference position (P2). These operations constitute 'work take-out step' and 'return-to-origin step' respectively.

The main routine is made of these steps and in an actual operation, it is programmed such that the above-mentioned cyclic steps are repeated a desired number of times. However, since the descending and lifting strokes of the hand 6 at the time of picking up the work which is not subjected to any working from the work supply base 1 as well as at the time of placing the product 10 on the product mounting base 4 must be changed corresponding to the height of the works on the work supply base 1 and the height of products on the product mounting base 4 which change corresponding to the number of repetitious operations.

So long as the above-mentioned main routine is executed normally, there arises no problem. However, when a trouble such as dropping of the work 2 which is not subjected to working or the product 10 occurs in the midst of the operation (T in the right side of FIG. 3), the above-mentioned cycle is temporarily stopped. Then, the operation is started again by a manual manipulation and if the manual manipulation is carried out making use of a sub routine Rs of the interference preventing method of the present invention, the robot can efficiently return to a normal routine operation by a combination of an automatic manipulation and a manual manipulation while preventing the occurrence of interference.
(CASE 1)

For the purpose of brevity, a case is considered in which the work 2 which is not yet subjected to any working is moved or shifted from the work mounting base 1 to the product stacking base 4 one by one. In this case, when a suction trouble occurs in the midst of traverse from the point P2 to the point P3 and the hand 6 is stopped at a position in the vicinity of the point P3, the hand 6 is returned to the point P1 where an absolute positioning of the work 2 can be determined so as to determine the relative positions of the hand 6 and the work 2. A new work 2 or the dropped work 2 is again sucked by the hand 6 at the point P1. Subsequently, the hand 6 which holds the work 2 is moved to the point P3 where the operation is stopped while watching the hand 6 and the work 2 not to interfere and continues the main routine from this position. It may be possible to input the point P3 as a target position and automatically move the hand 6 and the work 2 from the point P1 to the point P3. In such a case, however, the hand 6 directly moves toward the point P3 while carrying out a lifting movement (in a direction of Y axis) and a lateral movement (in a direction of X axis) simultaneously so that the hand 6 is liable to cause an interference with a guide 11 or a magnet floater.

According to the present invention, if the probability of interference is checked at a step I of the sub routine shown in FIG. 1, firstly, the coordinates of the point P3 which represent the present position are read on (step II).

The difference between the present position and the target position to which the hand 6 is moved is computed (step III). The judgement is made whether the difference is within a predetermined range or not (step IV). If the difference is within the predetermined range, the moving speed of the hand 6 is set to a normal speed (step V), while if the difference is out of the predetermined range, the moving speed of the hand 6 is set to a low speed (step VI). For example, provided that the coordinates (x,y) of the point P1 are (500, 400), and the predetermined range is x=±100 and y=±100, and the coordinates (x,y) of the taught target point P3 are (1500, 1400), the present position (500, 400) is read at the step II, and the difference Xd, Yd between the coordinates of the present position and the coordinates (1500, 1400) of the target position is computed at the step III. In this case, since Xd=1000 and Yd=1000, it is judged that both coordinates exceed the allowable range ±100. Accordingly, the speed of the hand 6 is set to the low speed in the step VI and the hand 6 is moved from the point P1 to the point P3 at the low speed.

In this manner, even when the work 2 is liable to come into contact with the guide 11, the operator can readily stop the operation of the hand 6 before the work comes into contact with the guide 11 thus preventing the interference.

After stopping the operation of the hand 6, the operator, by a manual manipulation, lifts the hand 6 in a direction of Y axis until the work 2 is lifted to a point PC which exceeds the guide 11, and subsequently lifts the hand 6 in a direction of Y axis while moving the hand 6 in a lateral direction by a manual manipulation, for example. Then, the hand 6 is again moved automatically from a position in the vicinity of the point P3 following the routine shown in FIG. 1. Since the difference between the position and the target position is within the allowable range (±100), the hand 6 is moved to the target position at the normal speed. Accordingly, the positioning of the hand 6 to the target position by the cumbersome manual manipulation can be obviated. It may be possible to execute the sub routine from the point PC while setting the point P3 as the target position for preventing the interference. After reaching the point P3 (target position), the operation is started again based on the program of the original main routine. As shown in FIG. 1, when the interference checking is not carried out, the operation is directly advanced to the step V to make the hand 6 move at a normal speed.

When a suction trouble occurs at a point Pn which is a position slightly above the point P1, the hand 6 is returned to the point P1 and the work 2 is again sucked by the hand 6 at the point P1 in a manner as mentioned previously. If the coordinates of the point Pn are taught as the target position and the operation is executed based on the sub routine shown in FIG. 1, the difference between the present position and the target position falls within the allowable range in the judgement in the step IV, and the moving speed of the hand 6 is set to a normal speed (step V) and the hand 6 is moved toward the point Pn at the normal speed. Accordingly, the operation can be returned to the original routine efficiently. After stopping the operation at the point P3 or the point Pn, it may be possible to execute the sub routine shown in FIG. 1 to return the hand 6 to the point P1 while setting the point P1 as the target position. In such a case, corresponding to the distance between the target position and the present position, the hand 6 can be also moved either at a low speed or at a normal speed so that the operator can stop the movement of the hand 6 just before the hand 6 interferes with the guide 11.

(CASE 2)

FIG. 4 shows a case in which the hand 6 which adheres the work 2 by suction is lifted from the work supply base 1 and the hand 6 is rotated 180° on the third axis J3 in the midst of movement thereof from a point Q3 to a point Q4 and the work 2 is dropped by a suction trouble during the rotation of the hand 6 between the point Q3 and the point Q4. In this case, the hand 6 is returned to a point Q1 by a manual manipulation. Then, after setting the point Q4 as the target point, the operation is started again based on the sub routine shown in FIG. 1 with an adhering of the work 2 by suction as a first step. Provided that an allowable angle of an inverting angle B of the third axis J3 is set to ±50°, since the present position is 0° and the target position is 180°, the difference between the target position and the present position becomes 180−0=180°>10° and it is judged that the difference is out of the predetermined range at the step IV. Accordingly, the moving speed of the hand 6 is set to a low speed at the step V and the hand 6 is moved to the point Q4 at the low speed. In this case, even when the traverse or shift amount of the hand 6 in a direction of Y axis is within an allowable range, the hand 6 is moved at the low speed in view of the allowable value of the inverting angle B.

(CASE 3)

FIG. 5a and FIG. 5b show a case in which the work 2 is picked up from the work supply base 1 and the work 2 is rotated 180° right after a slight lifting thereof and the operation is stopped in the midst of the rotation because of a trouble during the rotation and the operation is again returned to a normal operation. In FIG. 5a, since an inverting angle B is set to 45°, if the rotation of the hand 6 is continued, the work 2 interferes with the works 2 mounted on the work supply base 1. Accordingly, the hand 6 must be rotated at a low speed.

On the other hand, in FIG. 5b, since the inverting angle B exceeds 90° and is close to 135°, the hand 6 can be rotated at a normal speed. Namely, provided that the target angle is set to 180°, the allowable angle should be set to 90°. In this case, in FIG. 5a, since the difference between the target angle and the present angle is 180°−45°=135°>90°, the rotating speed of the hand 6 is set to be a low speed, while, in FIG. 5b, since the difference between the target angle and the present angle is 180°−135°=45°>90°, the rotating speed of the hand 6 is set to be a normal speed. Although, in case 2 and case 3, hand 6 is inverted at an angle B, the allowable rotating value varies depending on changes of conditions around the robot and on the target position.

(CASE 4)

FIG. 6 shows a case in which one edge of the work 2 is inserted in the bending mold 8 of the bending machine 3, the hand 6 is retracted, the hand 6 is rotated on the vertical axis J4, the hand 6 is advanced so as to insert the other edge of the work 2 in the bending mold 8. In these steps, when the work 2 is dropped in the midst of rotation from a point R3 to a point R4, the work 2 is placed and positioned in the bending mold 8 again and the hand 6 which is returned to the point R1 grips the work 2 and the hand 6 is operated to move to the position R3 based on the sub routine shown in FIG. 1. In this case, the allowable angle Ad of a revolving angle A is set to ±45°. Since the present position (A=0°) is read by an encoder and the difference between the target position (A=180°) and the present position is 180°>45°, the hand 6 is revolved at a low speed. Accordingly, even when the retracting and revolving of the hand 6 are carried out simultaneously and the possibility of interference of the work 2 with the mold arises, the operator can stop the movement of the hand 6 right before the occurrence of the interference. When the hand 6 is not set to a low speed operation, the operation of the hand 6 is continued at a normal speed.

The above-mentioned interference preventing method can be carried out using the robot 62 shown in FIG. 7 while incorporating the sub routine shown in FIG. 1 to the conventional operational program. As means for reading the present position of the hand 6, the encoders which are already incorporated in the original robot for reading the rotating angle can be utilized as it is, while the conventional teaching means can be utilized as means for teaching the target positions. Although the above-mentioned embodiment of the present invention is explained in view of the robot having 4 degrees of freedom on rotated joints (J1 to J4) and 4 moving coordinates (X, Y, A, B), the robot having 2 to 3 degrees of freedom or equal to or more than 5 degrees of freedom can be used in the interference preventing method of the present invention.

Although the embodiment is mainly explained in view of cases in which the operation is returned to the main routine after being stopped by the occurrence of a trouble, the method of the present is not restricted to these cases and can be applied to other cases, e.g. a case in which the method is applied to teaching of an operational route based on a basic routine so as to make the hand move to a specified target position efficiently.

Industrial Applicability

The interference preventing method of the present invention can readily return the operation to the original routine while preventing the interference in such a case that the work is dropped in the midst of the operation so that the operational efficiency is enhanced. The robot of the present invention carries out such a method.

What is claimed is:

1. An interference preventing method for industrial robots in which a hand of a robot is automatically moved toward a taught target position, comprising
 a step of reading a present position of the hand,
 a step of computing the difference between the taught target position and the present position of the hand,
 a step of judging whether the difference is within a predetermined range or not,
 a step of setting a moving speed of the hand to a determined normal speed when the difference is within the predetermined range and the hand is closer to the destination point and the probability of the interference is lower, while setting the moving speed of the hand to a predetermined low speed when the difference is out of the predetermined range and the hand is far away from the destination point and the probability of the interference is greater, and a step of moving the hand automatically to the target position at a set speed.

2. The interference preventing method for industrial robots according to claim 1, wherein the taught target position and the present position of the hand are each defined by coordinates alone a plurality of coordinate axes, and wherein the difference between the taught target position and the present position of the hand is calculated according to the coordinates alone one of the coordinate axes.

3. The interference preventing method for industrial robots according to claim 2, comprising setting the moving speed of the hand to the low speed according to the difference calculated according to the coordinates along the one of the coordinate axes.

4. A handling robot which repeats an operation to pick up a work from a predetermined position and transfer the work to another position in place in accordance with a taught path and an operational sequence, the robot comprising a hand to grip the work, a mechanism to move the hand, a detector which detects a present position of the hand, means for teaching a target position of the hand, means for storing a hand moving speed, the hand moving speed being variable at least in two stages and a predetermined range of difference between that taught position and the present position of the hand, means for computing the difference between the taught target position and the present position of the hand, means for judging whether the difference is within the predetermined range or not, and means for setting the moving speed of the hand to a normal speed when the obtained difference is within the predetermined range and the hand is closer to the thought point and the probability of interference is lower, while setting the moving speed of the hand to a low speed when the obtained difference is not within the predetermined range, the hand is far away.

* * * * *